United States Patent [19]

McWhirter

[11] 4,072,133

[45] Feb. 7, 1978

[54] INTAKE MANIFOLD WITH INTERNAL PASSAGES ARRANGED TO SIMPLIFY CORING

[75] Inventor: Ralph A. McWhirter, Mount Morris, Mich.

[73] Assignee: General Motors Corporation, Detroit, Mich.

[21] Appl. No.: 679,452

[22] Filed: Apr. 22, 1976

[51] Int. Cl.$^2$ .................. F02M 25/06; F02B 27/00
[52] U.S. Cl. .................. 123/52 MV; 123/119 A; 123/122 AB
[58] Field of Search .......... 123/41.82, 52 MV, 119 A, 123/122 AB, 122 AC

[56] References Cited

U.S. PATENT DOCUMENTS

| | | | |
|---|---|---|---|
| 1,437,395 | 12/1922 | Brush | 123/122 AC |
| 2,730,091 | 1/1956 | Burrell | 123/52 MV |
| 2,936,746 | 5/1960 | Rundquist | 123/52 MV |
| 3,014,470 | 12/1961 | Burrell | 123/52 MV |
| 3,032,022 | 5/1962 | Malcolm et al. | 123/52 MV |
| 3,181,517 | 5/1965 | Keinath | 123/52 MV |
| 3,717,130 | 2/1973 | Thornburgh | 123/119 A |
| 3,717,131 | 2/1973 | Chana et al. | 123/52 MV |
| 3,915,128 | 10/1975 | Rich | 123/52 MV |
| 3,937,196 | 2/1976 | Cook et al. | 123/119 A |

Primary Examiner—Martin P. Schwadron
Assistant Examiner—G. L. Walton
Attorney, Agent, or Firm—Robert J. Outland

[57] ABSTRACT

An intake manifold for a V-type internal combustion engine has transversely spaced longitudinal plenums feeding lateral plenum passages and fed by individual risers. The latter are joined by short lateral passages to a longitudinal exhaust gas recirculation passage extending between the plenums. These joined passages are formed so that no unconnected portions are located in vertical overlapping relation, and thus the joined passages may be formed in casting by a single monolevel core. A separate exhaust gas crossover passage connected with a metered exhaust recirculation passage is formed by a second core, while a third core is used to form a separate water crossover passage. The arrangement reduces the number of cores used to three from the five used in previous similar manifold arrangements.

5 Claims, 5 Drawing Figures

INTAKE MANIFOLD WITH INTERNAL PASSAGES ARRANGED TO SIMPLIFY CORING

This invention relates to internal combustion engines and more particularly to intake manifolds for V-type internal combustion engines in which the various manifold passages are arranged to simplify manufacture by reducing the number of cores required in the casting process.

In the manufacture of intake manifolds for internal combustion engines, it is known to produce integrally cast manifolds in which the various passages are formed by one or more cores, the number required being dependent on the arrangement and complexity of the passages to be formed. For example, the intake manifold arrangement disclosed by Chana, Rado and White in U.S. Pat. No. 3,717,131 and assigned to the assignee of the present invention is of a type which has been used in eight-cylinder V-type gasoline fueled automotive internal combustion engines. This manifold includes two separately defined groups of interconnecting air passages having vertically overlapping portions. Also included are two separately defined exhaust passage portions arranged to provide mixture heating and exhaust recirculation. These also extend in vertically overlapping relation to one another and to the air passages. The result is that casting of this manifold requires the use of a minimum of four separate monolevel cores to form the various passages. If the manifold is also provided with a separate water crossover passage, as is often the case, the use of a fifth core is necessary in the casting process.

In another manifold arrangement which has been used on six-cylinder V-type engines, two groups of air passages, each including a longitudinal plenum, are transversely spaced on opposite sides of the manifold's longitudinal centerline, so that they are separated and do not lie in vertically overlapping relation. This manifold also includes two separate exhaust gas passages separated from, but vertically overlapping, the air passages and further includes a water crossover passage. Due to the arrangement, it has been necessary to cast this manifold using five separate cores to form the various passages in much the same manner required of the arrangement of U.S. Pat. No. 3,717,131.

While the use of separate cores in casting is a common and accepted practice, it is recognized that advantages in manufacturing speed and accuracy of wall dimensions may be obtained by reducing the number of cores uses so as to reduce the possibility of misalignment or shift in the manufacturing process. Decreasing the number of cores can also reduce the time required for setting the cores.

The present invention provides an improved intake manifold arrangement for V-type engines which involves a redesign of the six-cylinder V-type engine manifold above-described to reduce the number of cores required in casting the manifold from five to three, with the resultant advantages of reduction in manufacturing cost and improved dimensional accuracy. The details as well as other objects and advantages of the invention will be more fully understood from the following description of a preferred embodiment shown in the accompanying drawings, wherein.

Figure 1:
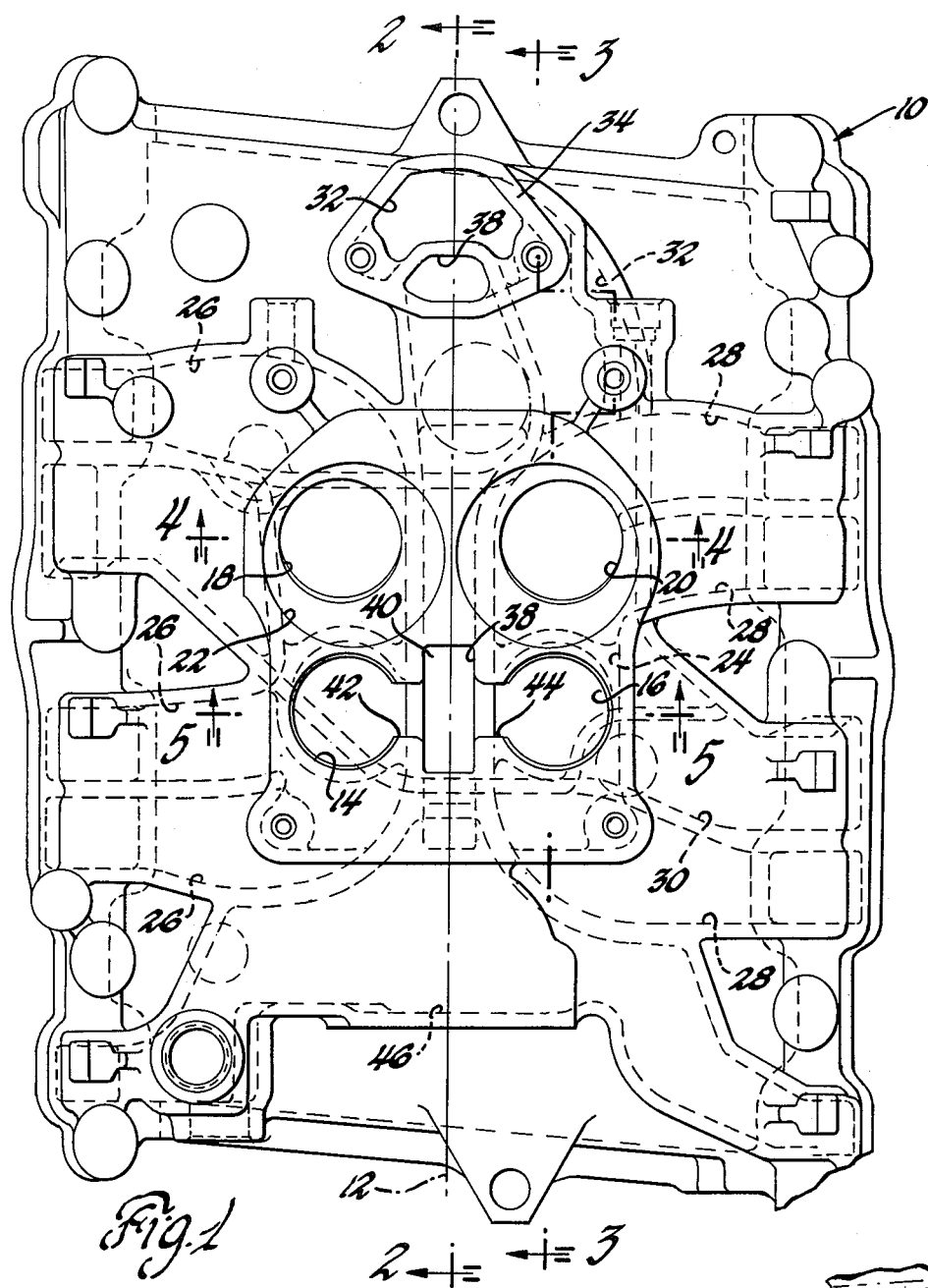
FIG. 1 is a top plan view of an intake manifold formed according to the invention.

Referring to the drawings in detail, numeral 10 generally indicates a single level split plenum intake manifold for a V-type internal combustion engine of the type having combustion chambers disposed along opposite sides of a longitudinal centerline 12. The manifold 10 is particularly adapted for use in six-cylinder V-type engines, although its features could be applied in manifolds for engines having other numbers of cylinders.

Manifold 10 comprises an integral cast metal body having a pair of transversely spaced primary riser passages 14, 16 and a pair of transversely spaced secondary riser passages 18, 20, which are spaced longitudinally from the primary riser passages 14, 16. Riser passages 14 and 18 connect with a plenum chamber 22, while riser passages 16 and 20 connect with a separate plenum chamber 24, the plenum chambers 22, 24 being generally horizontal and extending longitudinally in transversely spaced relation on opposite sides of the centerline to connect with transversely reaching runner passages 26, 28, respectively.

Figure 2:
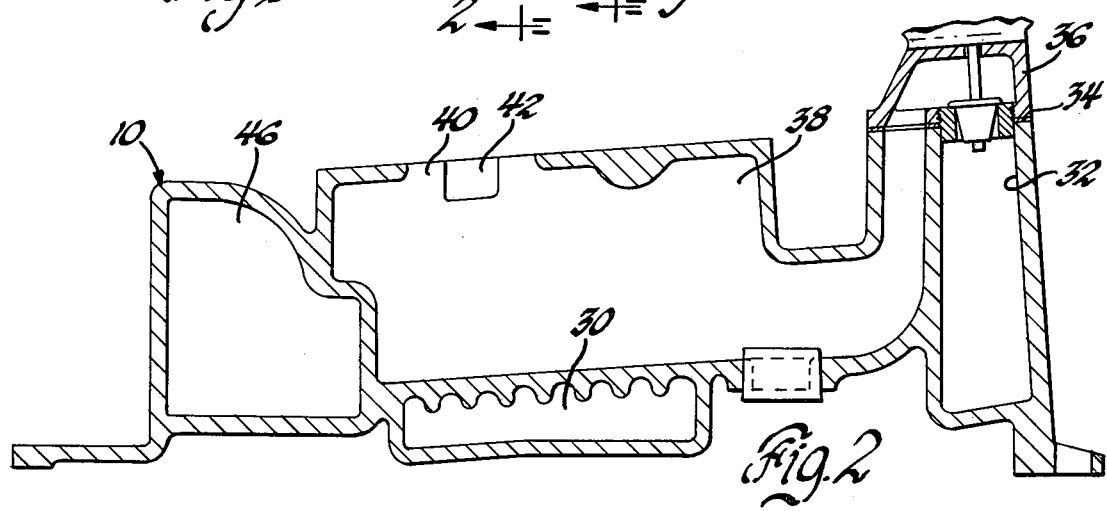
FIG. 2 is a longitudinal cross-sectional view taken along the line 2—2 of FIG. 1 and showing portions of the exhaust gas and water passages.
Figure 3:
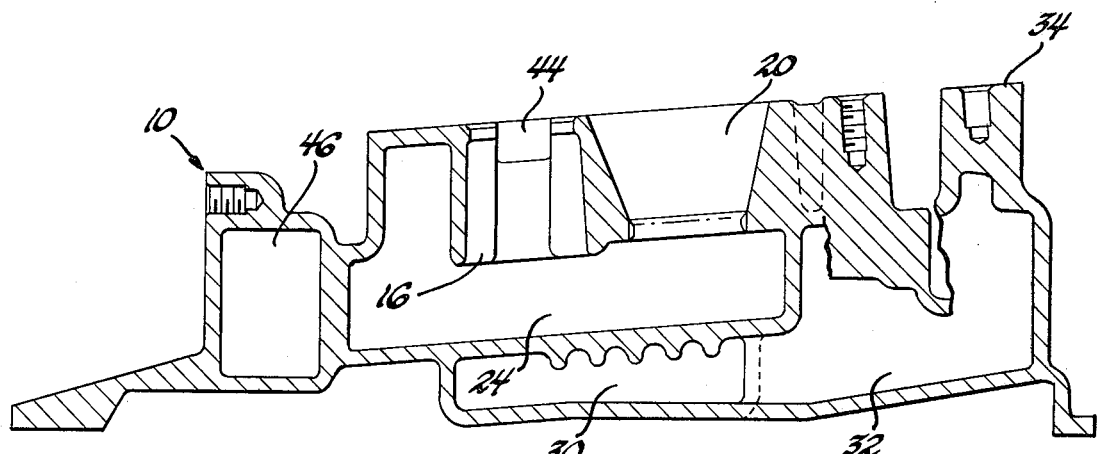
FIG. 3 is a longitudinal cross-sectional view taken along the line 3—3 of FIG. 1 and showing portions of the air, exhaust and water passages.
Figure 4:
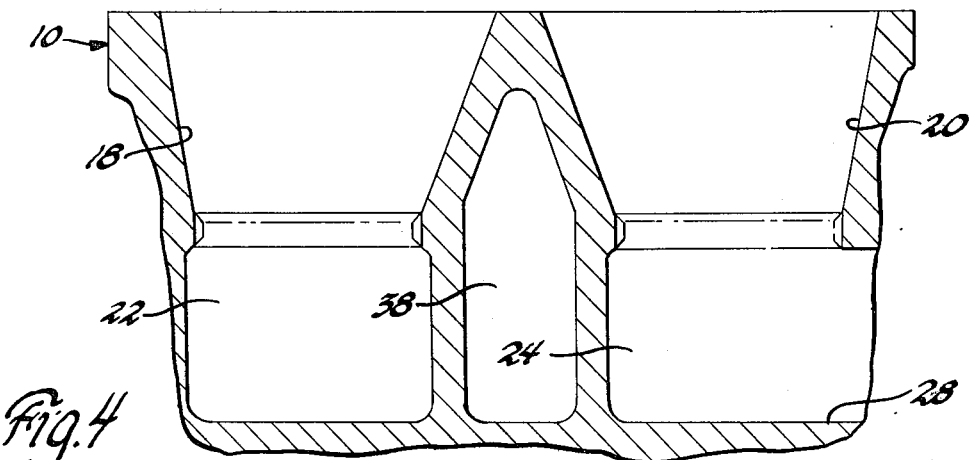
FIG. 4 is an enlarged sectional view taken along the line 4—4 of FIG. 1 and showing the form of the secondary riser passages.
Figure 5:
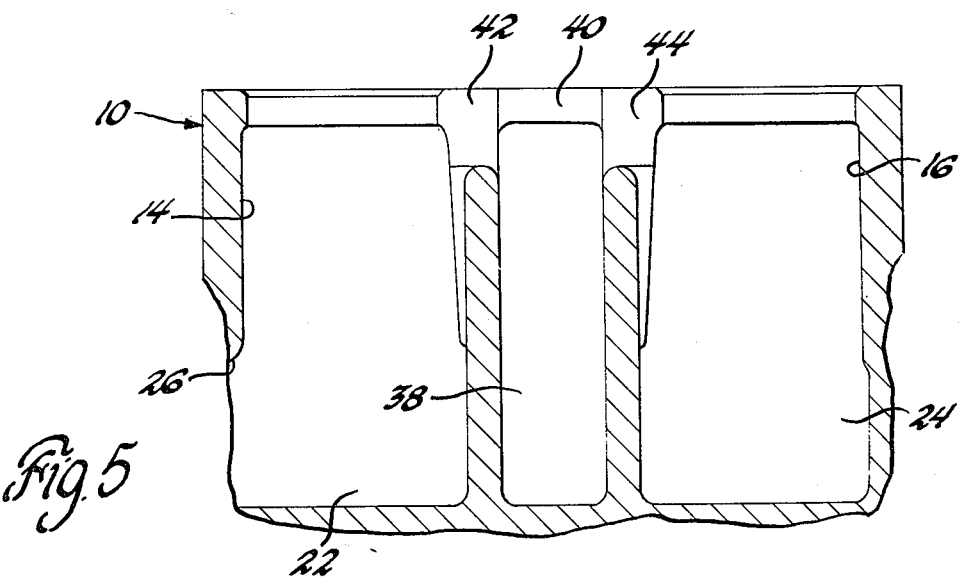
FIG. 5 is an enlarged sectional view taken along the line 5—5 of FIG. 1 and showing the form of the primary riser passages and their connection with the metered exhaust recirculation passage.

An exhaust gas crossover passage 30 extends transversely under and in heat exchange relation with the plenum chambers 22, 24 in the region below the primary and secondary riser passages. An exhaust gas recirculation feed passage 32 extends from the exhaust gas crossover passage 30 to a pad 34 which is adapted to receive an exhaust gas recirculation control valve assembly 36. This assembly is partially shown in FIG. 2 and may be of the type disclosed for example in the previously mentioned U.S. Pat. No. 3,717,131. Alternatively, an exhaust gas recirculation control valve assembly of different design could be utilized and could be mounted on the manifold in any suitable manner.

A metered exhaust gas passage 38 extends from pad 34 longitudinally along centerline 12 and between the plenum chambers 22, 24 and their connecting riser passages, opening through the top of the manifold at a location 40 between the primary riser passages 14, 16. At this point, the metered exhaust gas passage 38 is connected with the primary riser passages 14, 16 by a pair of short lateral passages 42, 44, respectively.

The manifold also includes a transversely extending water crossover passage 46 separate from, and longitudinally spaced adjacent to, the air and exhaust gas passages of the manifold.

In operation, a fuel injection throttle body or a carburetor (not shown) is mounted on the manifold in registration with riser passages 14, 16, 18, 20 and supplies air or an air-fuel mixture to the manifold induction passages comprising risers 14, 18, plenum 22 and runners 26 located on one side of the centerline 12 and risers 16, 20, plenum 24 and runners 28 located on the other side of the centerline. The air or air-fuel mixture passing through the induction passages is heated by exhaust gas flowing through the exhaust gas crossover passage 30. In addition, some of the exhaust gas is recirculated from crossover passage 30 through passage 32, valve 36 and passages 40, 42 and 44 to the induction passages at the primary risers 14 and 16. The water crossover passage 46 interconnects the cooling jackets of adjacent engine cylinder heads (not shown) and provides an outlet for the cooling water from these jackets.

It will be noted that the manifold design is such that the induction passages on opposite sides of the centerline 12 are disposed at the same level and are essentially separated from one another, except for their connection with the metered exhaust gas recirculation passage 38 through the short passages 42, 44 at the tops of the primary risers 14, 16, respectively. It will be further noted that the induction passages and the metered exhaust passage 38 are arranged so that they have no portions that extend in vertically overlapping relation, except where they are connected, as at the primary risers. In other words, no part of any one of these passages extends over or under any other part of one of these passages, except where there is a vertical connection between them. This aspect of the design is intentional and permits these passages to be cast using a single monolevel core that simplifies core setting procedures and eliminates the possibility of dimensional variations due to core shift in manufacturing of these interconnected passages.

It is apparent that the exhaust gas crossover passage 30 extends underneath the induction passages and the metered exhaust passage 38 and, thus, must be formed with a separate core. However, passage 30 is interconnected with the exhaust recirculation feed passage 32 and thus the cores for these two passages may be integrated into a single unit. The separate water crossover passage must, of course, be formed using a separate individual third core. The result is a manifold arrangement which may be cast using only three passage forming cores instead of the five cores required for casting the previous similar manifold design.

It will be noted that the primary risers 16 are formed by extensions of the main core upwardly from the plenum chamber portions 18, 20. The parting line that separates this core from the upper half of the mold which forms the top of the manifold is located near the top of the primary risers. The opposite is true of the secondary risers 18, 20, which are formed by downward extensions of the upper half of the mold and have the parting line at their lower ends where they connect with the plenum chambers 18, 20.

The invention has been disclosed by reference to an embodiment especially adapted for use on a V-type six-cylinder engine arranged to receive a four barrel carburetor having two primary and two secondary throats. It should be understood, however, that the significant features of the invention could equally well be applied to a similar manifold intended for use with a two barrel carburetor, in which case the secondary risers would be eliminated from the design and the two remaining primary risers would be repositioned near the center portions of their respective plenums. Additionally, the features of this invention could be applied to manifolds for engines having more or less than six cylinders, if desired, or to manifold designs which exclude the water crossover passage or the exhaust gas crossover passage. Since these and other modifications of the invention could be made by those skilled in the art without departing from the scope of the inventive concepts disclosed, it is intended that the invention not be limited, except by the language of the following claims.

I claim:

1. A single level intake manifold for supplying air and exhaust gas to a V-type internal combustion engine having combustion chambers disposed along opposite sides of a longitudinal centerline, said manifold comprising a casting having a pair of generally vertical riser passages transversely spaced on opposite sides of said centerline, a pair of generally horizontal plenum chambers transversely spaced on opposite sides of said centerline and extending longitudinally at a common level, each connecting with the bottom of one of said riser passages, runner passages extending from said plenum chambers laterally away from said centerline, a metered exhaust gas recirculation passage extending longitudinally along said centerline and between said plenum chambers and their connecting riser passages, said metered exhaust gas recirculation passage being joined laterally with said riser passages by short lateral passages therebetween, said plenum chambers and said passages all being formed by coring and being joined with no unconnected portions extending in vertical overlapping relation with one another whereby such chambers and passages may be formed by a single monolevel core.

2. A single level intake manifold as defined in claim 1 and further comprising a pair of generally vertical secondary riser passages transversely spaced on opposite sides of said centerline and longitudinally spaced from said first named riser passages, said secondary riser passages connecting at their bottom ends with the plenum chambers on their respective sides of said centerline.

3. A single level intake manifold for supplying air and exhaust gas to a V-type internal combustion engine having combustion chambers disposed along opposite sides of a longitudinal centerline, said manifold comprising a casting having a pair of generally vertical riser passages transversely spaced on opposite sides of said centerline, a pair of generally horizontal plenum chambers transversely spaced on opposite sides of said centerline and extending longitudinally at a common level, each connecting with the bottom of one of said riser passages, runner passages extending from said plenum chambers laterally away from said centerline, an exhaust gas crossover passage extending transversely under and in heat exchange relation with the surface of said plenum chambers below said riser passages, an exhaust gas recirculation feed passage connected with and extending from said exhaust crossover passage to means for receiving an exhaust gas recirculation control valve adapted to meter the flow of exhaust gas through said exhaust gas recirculation feed passage, and a metered exhaust gas recirculation passage extending from said valve receiving means longitudinally along said centerline and between said plenum chambers and their connecting riser passages, said metered exhaust gas recirculation passage being joined laterally with said riser passages by short lateral passages therebetween, said plenum chambers and said passages all being formed by coring and said plenum chambers, runner passages, riser passages, lateral passages and metered exhaust gas recirculation passage being joined and having no unconnected portions extending in vertically overlapping relation with one another whereby said joined chambers and passages may be formed by a single monolevel core, while the exhaust crossover passage and the exhaust gas recirculation feed passage connected thereto may be formed by a second monolevel core.

4. A single level intake manifold as defined in claim 3 and further comprising a pair of generally vertical secondary riser passages transversely spaced on opposite sides of said centerline and longitudinally spaced from said first named riser passages, said secondary riser passages connecting at their bottom ends with the plenum chambers on their respective sides of said centerline.

5. A single level intake manifold as defined in claim 3 and further comprising a water crossover passage extending transversely of the manifold adjacent to but unconnected with said air and gas passages, said water crossover passage having the capability of being formed by a third monolevel core.

* * * * *